US012632720B2

(12) United States Patent
Ma et al.

(10) Patent No.: US 12,632,720 B2
(45) Date of Patent: May 19, 2026

(54) EVALUATING SYSTEM GENERATED HISTORICAL TRANSACTION TIMELINE IMAGES

(71) Applicant: International Business Machines Corporation, Armonk, NY (US)

(72) Inventors: Yi-Hui Ma, Mechanicsburg, PA (US); Eugene Irving Kelton, Wake Forest, NC (US); Shuyan Lu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 17/075,797

(22) Filed: Oct. 21, 2020

(65) Prior Publication Data

US 2022/0121923 A1      Apr. 21, 2022

(51) Int. Cl.
G06N 3/08          (2023.01)
G06F 16/23          (2019.01)

(52) U.S. Cl.
CPC ........... G06N 3/08 (2013.01); G06F 16/2379 (2019.01)

(58) Field of Classification Search
CPC . G06N 3/08; G06N 7/02; G06N 20/00; G06F 16/23
See application file for complete search history.

(56) References Cited

U.S. PATENT DOCUMENTS

| | | |
|---|---|---|
| 6,742,124 B1 | 5/2004 | Kilpatrick et al. |
| 6,996,551 B2 | 2/2006 | Hellerstein et al. |
| 9,235,752 B2 | 1/2016 | Eaton et al. |
| 10,375,098 B2 | 8/2019 | Oliner et al. |
| 10,642,898 B1 * | 5/2020 | Pratt ....................... G06T 19/20 |
| 10,732,902 B1 * | 8/2020 | Lazier ................. G06F 16/2228 |
| 11,551,081 B2 * | 1/2023 | Krishnan ................. G06N 3/09 |
| 2003/0153299 A1 | 8/2003 | Perfit et al. |
| 2005/0256813 A1 * | 11/2005 | Bahbouh ................. G06N 7/02 |
| | | 706/1 |
| 2011/0044492 A1 | 2/2011 | Cobb et al. |
| 2011/0071969 A1 * | 3/2011 | Doctor .................. G06N 3/043 |
| | | 706/15 |
| 2014/0081713 A1 * | 3/2014 | Gifford ................. G06Q 10/06 |
| | | 705/7.42 |

(Continued)

OTHER PUBLICATIONS

"Basic classification: Classify images of clothing", TensorFlow, Printed on Oct. 19, 2020, 14 pages, < https://www.tensorflow.org/tutorials/keras/classification>.

(Continued)

*Primary Examiner* — Phenuel S Salomon
(74) *Attorney, Agent, or Firm* — Seed Intellectual Property Law Group LLP

(57)          ABSTRACT

In an approach for evaluating system generated historical transaction timeline images for a computer vision deep learning process, a processor provides one or more chart evaluation factors for evaluating historical timeline images for a deep learning of patterns based on the historical timeline images. A processor generates a quantitative metric based on the one or more chart evaluation factors using a quantitative technique. A processor determines a score for an input timeline image based on the quantitative metric. A processor filters input space based on the score. A processor, in response to receiving a feedback, adjusts a chart setting based on the one or more chart evaluation factors.

9 Claims, 8 Drawing Sheets

(56) References Cited

U.S. PATENT DOCUMENTS

| | | | | |
|---|---|---|---|---|
| 2014/0234814 | A1* | 8/2014 | Krosky | G09B 15/00 |
| | | | | 434/236 |
| 2015/0339689 | A1* | 11/2015 | Chen | G06Q 30/0282 |
| | | | | 705/7.34 |
| 2016/0259896 | A1 | 9/2016 | Yang | |
| 2017/0140384 | A1 | 5/2017 | Zoldi et al. | |
| 2017/0330075 | A1 | 11/2017 | Tuysuzoglu et al. | |
| 2018/0114169 | A1* | 4/2018 | Wiig | G06N 5/048 |
| 2018/0276541 | A1* | 9/2018 | Studnitzer | G06N 3/044 |
| 2018/0336506 | A1* | 11/2018 | Malhotra | G06Q 20/3224 |
| 2018/0365065 | A1* | 12/2018 | Guttmann | G06F 7/14 |
| 2019/0034828 | A1* | 1/2019 | Cagadas | G06N 20/00 |
| 2019/0037081 | A1* | 1/2019 | Rao | H04M 3/5175 |
| 2019/0259033 | A1* | 8/2019 | Reddy | G06N 5/02 |
| 2020/0097851 | A1* | 3/2020 | Alvarez | G06F 16/242 |
| 2020/0250472 | A1* | 8/2020 | Abhyankar | G06F 18/2411 |
| 2022/0067752 | A1* | 3/2022 | Fang | G06N 3/08 |

OTHER PUBLICATIONS

Adhianto et al. "HPCToolkit: Tools for performance analysis of optimized parallel programs." Concurrency and Computation: Practice and Experience 22.6, 2010, pp. 685-701.

Aguilar et al., "Visual MPI Performance Analysis using Event Flow Graphs" Procedia Computer Science, vol. 51, 2015, pp. 1353-1362.

Andrearczyk, Vincent, "Deep learning for texture and dynamic texture analysis", Dissertation for the degree of Doctor of Philosophy. Dublin City University, Sep. 2017, 189 pages.

Chen et al., "Machine learning techniques for anti-money laundering (AML) solutions in suspicious transaction detection: a review", Knowledge and Information Systems, Feb. 10, 2018, 41 pages, <https://doi.org/10.1007/s10115-017-1144-z>.

Kelton et al., "Classifying Behavior Through System-Generated Timelines and Deep Learning", U.S. Appl. No. 16/867,355, filed May 5, 2020, 32 pages.

Ma et al., "Cognitive Methodology for Sequence of Events Patterns in Fraud Detection", U.S. Appl. No. 15/971,943, filed May 4, 2018, 33 pages.

Sim et al., "Is Deep Learning for Image Recognition Applicable to Stock Market Prediction?", Hindawi, Complexity, vol. 2019, Article ID 4324878, 11 pages, <https://doi.org/10.1155/2019/4324878>.

Soderlind Simon, "Application Performance Evaluation using Deep Learning" MS thesis. Universitat Politècnica de Catalunya, 2017, 69 pages.

Suzumura et al., "Towards Federated Graph Learning for Collaborative Financial Crimes Detection", Cornell University arXiv, preprint arXiv:1909.12946, Oct. 2, 2019, 10 pages.

Wang et al. "Deep learning for smart manufacturing: Methods and applications", Journal of Manufacturing Systems, 48, 2018, pp. 144-156.

Wolf et al. "Efficient Pattern Search in Large Traces Through Successive Refinement" European Conference on Parallel Processing. Springer, Berlin, Heidelberg, 2004, 8 pages.

* cited by examiner

100

NETWORK
108

COMPUTING DEVICE
102

METRIC GENERATION MODULE
110

CHART EVALUATION
FACTORS
112

QUANTITATIVE METRIC
114

EVALUATION MODULE
116

TIMELINE
IMAGES
104

COGNITIVE
SYSTEM
106

500 rating scale table

| | definition |
|---|---|
| 1 | Two factors are equal |
| 3 | Judgement slightly favor one over the other |
| 5 | Judgement strongly favor one over the other |
| 7 | Judgement very strongly favor one over the other |
| 9 | Judgement extremely favor one over the other |

504

Psychology - Pairwise Comparison

Evaluate 3 different factor values for a specific factor based on rating scale table

| | FV1 | FV2 | FV3 |
|---|---|---|---|
| FV1 | 1 | 5 | 9 |
| FV2 | 1/5 | 1 | 3 |
| FV3 | 1/9 | 1/3 | 1 |

502

Mathematics – eigenvector for metric

| FV1 | FV2 | FV3 |
|---|---|---|
| 0.751 | 0.178 | 0.071 |

Scoring Function using exponential distribution

For factor A : y = 1 - exp(-c * |x|)    where c = 0.346

For factor B : y = 1 - exp(-c * |x|)    where c = 0.25

For factor C : y = 1 - exp(-c * |x|)    where c = 0.18

Different curves can be built for each factor, where the metric for different factor values can be obtained.

— Factor A

— Factor B

— Factor C

Factor value (FV)

metric

EVALUATING SYSTEM GENERATED HISTORICAL TRANSACTION TIMELINE IMAGES

BACKGROUND

The present disclosure relates generally to the field of detection of behavior patterns, and more particularly to evaluating system generated historical transaction timeline images for a computer vision deep learning process to predict labeled behavioral similarities.

Predicting human behavior can be extremely difficult, but it can also be very useful for a wide variety of purposes such as business, financial, and law enforcement. One example that spans these areas is fraud detection. Fraud detection has become a special form of technology. Fraud appears in many different forms and the detection of fraud relies on a system with the capability to recognize or discover these fraudulent activities/events. More advanced approaches to fraud detection involve cognitive technology. A cognitive system (sometimes referred to as deep learning, deep thought, or deep question answering) is a form of artificial intelligence that uses machine learning and problem solving. Cognitive systems often employ neural networks although alternative designs exist. A cognitive system is not limited to the use of a single approach, i.e., it can incorporate any number of these machine learning algorithms. These algorithms can produce a score or confidence value indicating the likelihood that a particular answer is correct.

SUMMARY

Aspects of an embodiment of the present disclosure disclose an approach for evaluating system generated historical transaction timeline images for a computer vision deep learning process. A processor provides one or more chart evaluation factors for evaluating historical timeline images for a deep learning of patterns based on the historical timeline images. A processor generates a quantitative metric based on the one or more chart evaluation factors using a quantitative technique. A processor determines a score for an input timeline image based on the quantitative metric. A processor filters input space based on the score. A processor, in response to receiving a feedback, adjusts a chart setting based on the one or more chart evaluation factors.

BRIEF DESCRIPTION OF THE DRAWINGS

FIG. 5 illustrates an example analytic hierarchical process for the metric generation module to use to generate a quantitative metric, in accordance with an embodiment of the present disclosure.

DETAILED DESCRIPTION

The present disclosure is directed to systems and methods for evaluating system generated historical transaction timeline images for a computer vision deep learning process to predict labeled behavioral similarities.

Embodiments of the present disclosure recognize a need for a chart information metric framework to facilitate the deep learning process through selecting proper charting parameter sets, reducing input dimension, and presenting a better insights selection. Embodiments of the present disclosure disclose generating chart information metric for the historical timeline images as part of the component to improve pattern detection in the deep event learning process. Embodiments of the present disclosure disclose a chart information metric framework to systematically evaluate the setting for chart generation. Embodiments of the present disclosure disclose providing chart evaluation factors against generated historical timeline images. Embodiments of the present disclosure disclose generating quantitative metrics using both subjective and objective methodologies based on the chart evaluation factors. Embodiments of the present disclosure disclose creating an ensemble score for an overall chart evaluation score. Embodiments of the present disclosure disclose using the ensemble score to filter input space. Embodiments of the present disclosure disclose obtaining a feedback based on insight to adjust a chart setting.

Figure 1:
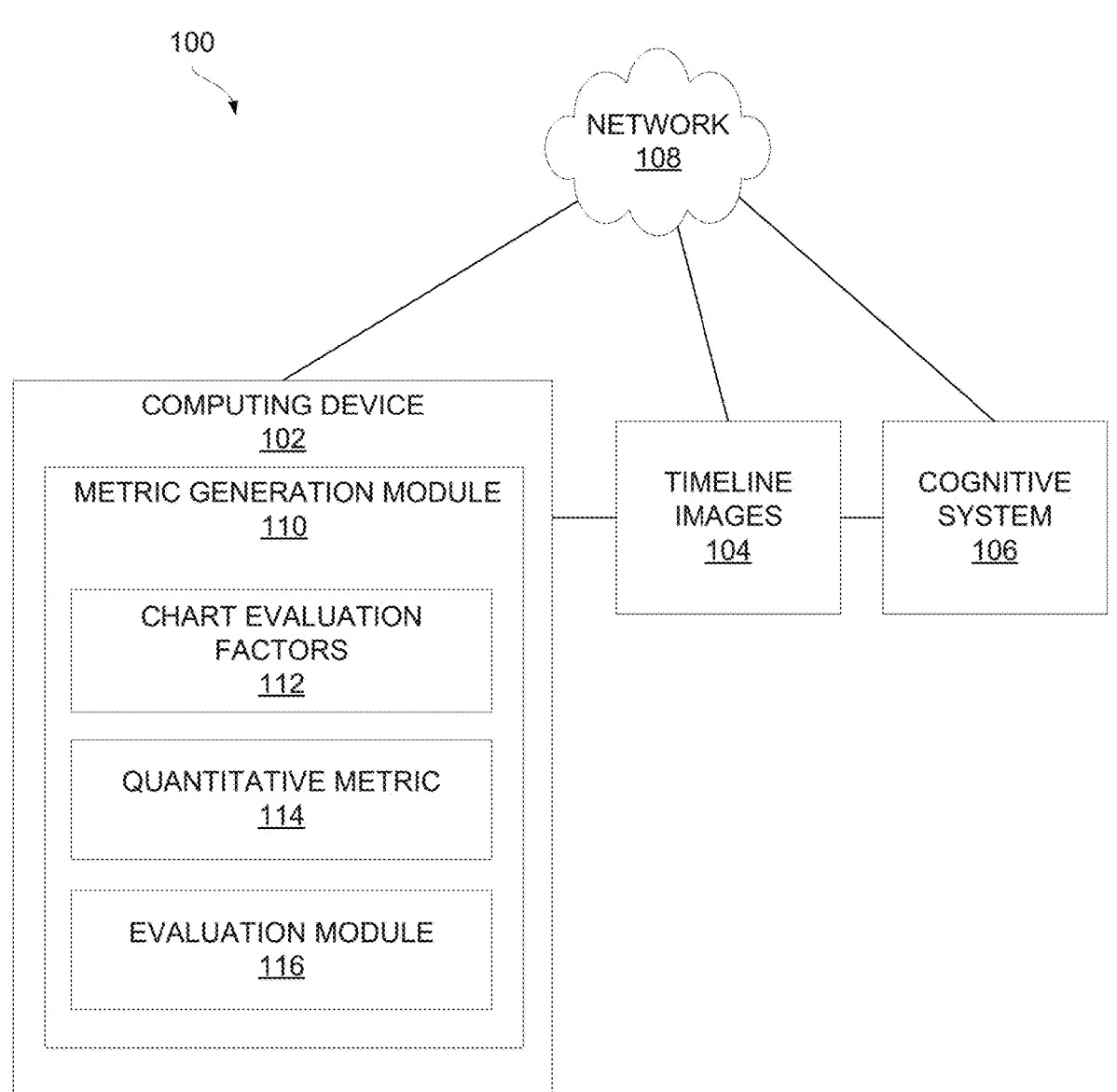
FIG. 1 is a functional block diagram illustrating a chart information metric generation environment, in accordance with an embodiment of the present disclosure.

The present disclosure will now be described in detail with reference to the Figures. FIG. 1 is a functional block diagram illustrating a chart information metric generation environment, generally designated 100, in accordance with an embodiment of the present disclosure.

In the depicted embodiment, chart information metric generation environment 100 includes computing device 102, timeline images 104, cognitive system 106 and network 108. In one or more embodiments, cognitive system 106 is configured to receive training data, e.g., including timeline images 104. In an example, cognitive system 106 is a deep learning model to predict behavior patterns. Once so trained, cognitive system 106 is able to predict behavior patterns. In an example, timeline images 104 may be chart images. Chart images may be tailored for the particular application in mind. For example, timeline images 104 may include chart type, scaling, color, marker shape, data density and other relative information for training cognitive system 106.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to metric generation module 110 and network 108 and is capable of processing program instructions and executing metric generation module 110, in accordance with an embodiment of the present disclosure. Computing device 102 may include internal and external hardware components, as depicted and described in further detail with respect to FIG. 8.

Further, in the depicted embodiment, computing device 102 includes metric generation module 110. In the depicted embodiment, metric generation module 110 is located on computing device 102. However, in other embodiments, metric generation module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and metric generation module 110, in accordance with a desired embodiment of the disclosure.

In one or more embodiments, metric generation module 110 is configured to provide chart evaluation factors 112 for evaluating timeline images 104 for a deep learning of patterns. Metric generation module 110 may provide chart evaluation factors 112 against generated historical timeline images. Timeline images 104 may be historical timeline images for training cognitive system 106. In an example, timeline images 104 may be chart images. Chart images may include chart type, scaling, color, marker shape, data density and other relative information for training cognitive system 106. Chart evaluation factors 112 may include complexity, information richness and data texture based on evaluating timeline images 104.

Figure 6:
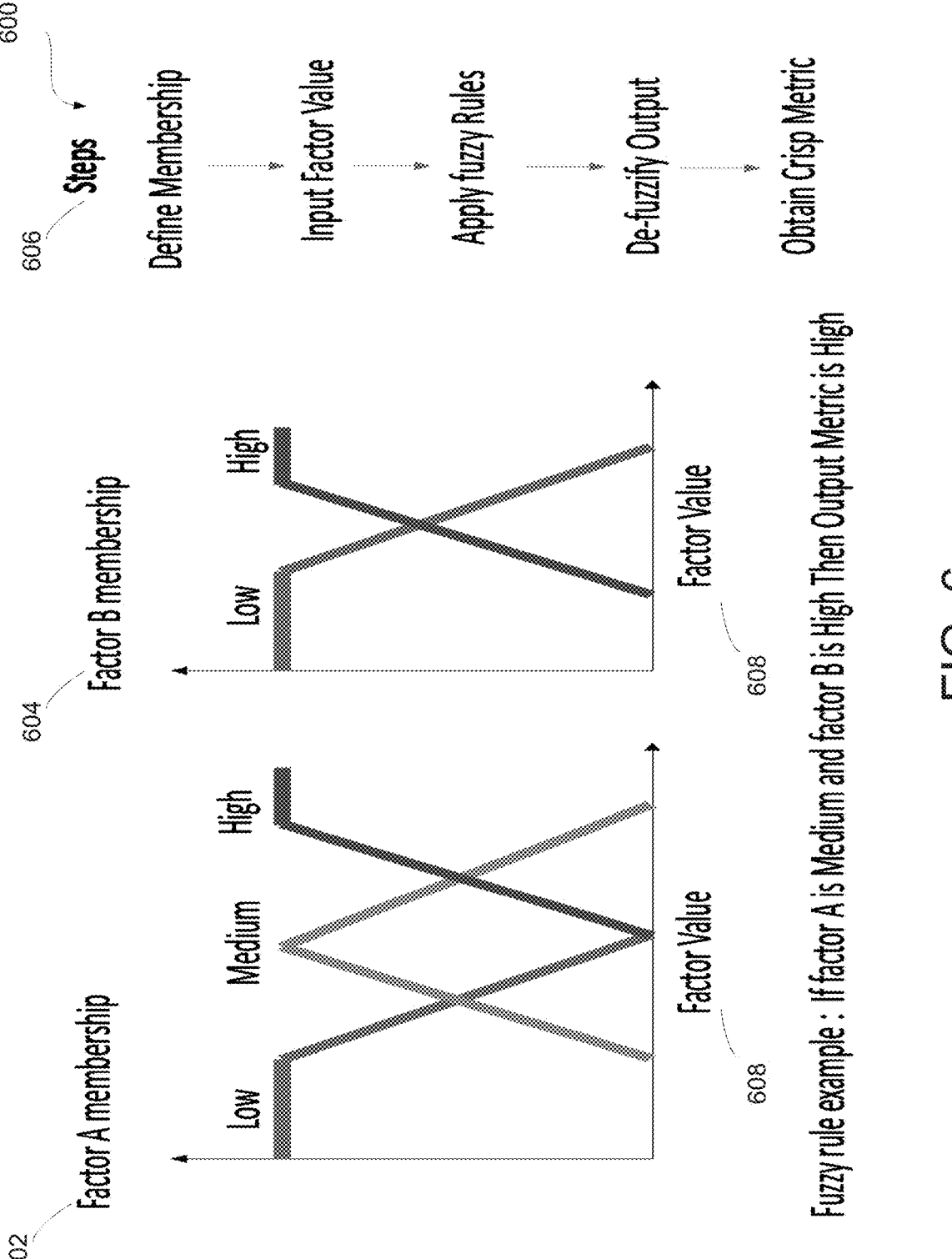
FIG. 6 illustrates an example fuzzy logic process for the metric generation module to use to generate the quantitative metric, in accordance with an embodiment of the present disclosure.
Figure 7:
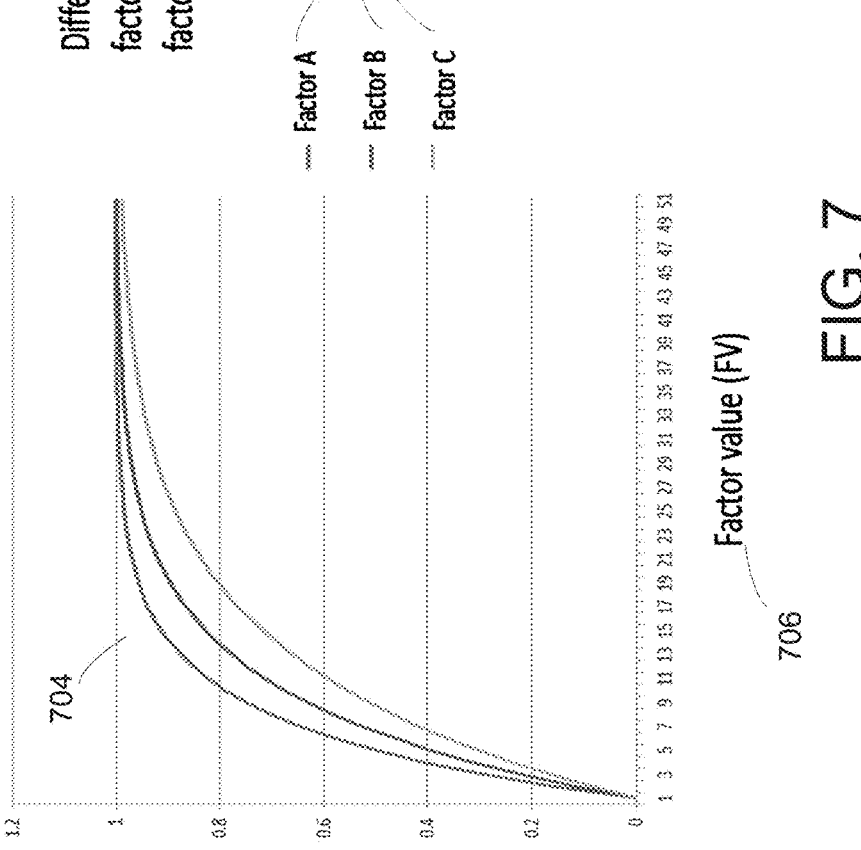
FIG. 7 illustrates an example statistical distribution for the metric generation module to use to generate the quantitative metric, in accordance with an embodiment of the present disclosure.

In one or more embodiments, metric generation module 110 is configured to generate quantitative metric 114 based on chart evaluation factors 112 using a quantitative technique. Quantitative metric 114 may be a set of figures or statistics that measure results. Metric generation module 110 may quantify timeline images 104 through different factors, e.g., chart evaluation factors 112, into quantitative metric 114. Metric generation module 110 may generate quantitative metric 114 using both subjective and or objective methodology. For example, metric generation module 110 may apply an analytic hierarchical process to generate quantitative metric 114. The analytic hierarchical process may be a structured technique for organizing and analyzing complex decisions, based on mathematics and psychology. An example analytic hierarchical process is illustrated in FIG. 5. In another example, metric generation module 110 may apply fuzzification (fuzzy logic) to generate quantitative metric 114. Fuzzy logic is a form of many-valued logic in which the truth values of variables may be any real number between 0 and 1 both inclusive. Fuzzification may be the process of assigning the numerical input of a system to fuzzy sets with some degree of membership. This degree of membership may be anywhere within the interval [0,1]. If it is 0 then the value does not belong to the given fuzzy set, and if it is 1 then the value completely belongs within the fuzzy set. Any value between 0 and 1 represents the degree of uncertainty that the value belongs in the set. An example fuzzy logic is illustrated in FIG. 6. In yet another example, metric generation module 110 may apply a statistical distribution to generate quantitative metric 114. An example statistical distribution is illustrated in FIG. 7. Metric generation module 110 may apply other suitable quantitative techniques to generate quantitative metric 114. Metric generation module 110 may apply combination of analytic hierarchical process, fuzzy logic, and statistical distribution to generate quantitative metric 114. Metric generation module 110 may generate quantitative metric 114 in a subjective metric. Metric generation module 110 may generate quantitative metric 114 in an objective metric. Metric generation module 110 may generate quantitative metric 114 in a metric between a subjective and objective metric.

In one or more embodiments, metric generation module 110 is configured to determine an ensemble score for an input timeline image based on quantitative metric 114. Metric generation module 110 may determine the ensemble score for overall chart evaluation score. Metric generation module 110 may determine the ensemble score by aggregating scores in quantitative metric 114 associated with chart evaluation factors 112. Metric generation module 110 may determine the ensemble score by using the highest score in quantitative metric 114 associated with chart evaluation factors 112. Metric generation module 110 may determine the ensemble score in any other suitable methods.

In one or more embodiments, metric generation module 110 is configured to filter input space based on the ensemble score. Metric generation module 110 may evaluate an input timeline image using the ensemble score. Metric generation module 110 may systematically evaluate the setting for charts generation. Metric generation module 110 may select input timeline image based on the ensemble score for training cognitive system 106.

In one or more embodiments, metric generation module 110 is configured to adjust a chart setting including chart evaluation factors 112 according to a feedback based on insights from a user. Metric generation module 110 may add chart information, e.g., quantitative metric 114 for timeline images 104 as part of the component to improve pattern detection in the deep event learning process. Metric generation module 110 may facilitate the deep learning process through selecting proper charting parameter sets, reducing input dimension and presenting better insights selection.

In the depicted embodiment, metric generation module 110 includes evaluation module 116. In one or more embodiments, evaluation module 116 is configured to determine an ensemble score for an input timeline image based on quantitative metric 114. Evaluation module 116 may determine the ensemble score by aggregating scores in quantitative metric 114 associated with chart evaluation factors 112. Evaluation module 116 may determine the ensemble score by using the highest score in quantitative metric 114 associated with chart evaluation factors 112. Evaluation module 116 may determine the ensemble score in any other suitable methods. Evaluation module 116 may evaluate an input timeline image using the ensemble score. Evaluation module 116 may filter input space based on the ensemble score. Evaluation module 116 may select input timeline image based on the ensemble score for training cognitive system 106. Evaluation module 116 may adjust a chart setting including the chart evaluation factors 112 according to a feedback based on insights from a user.

Figure 2:
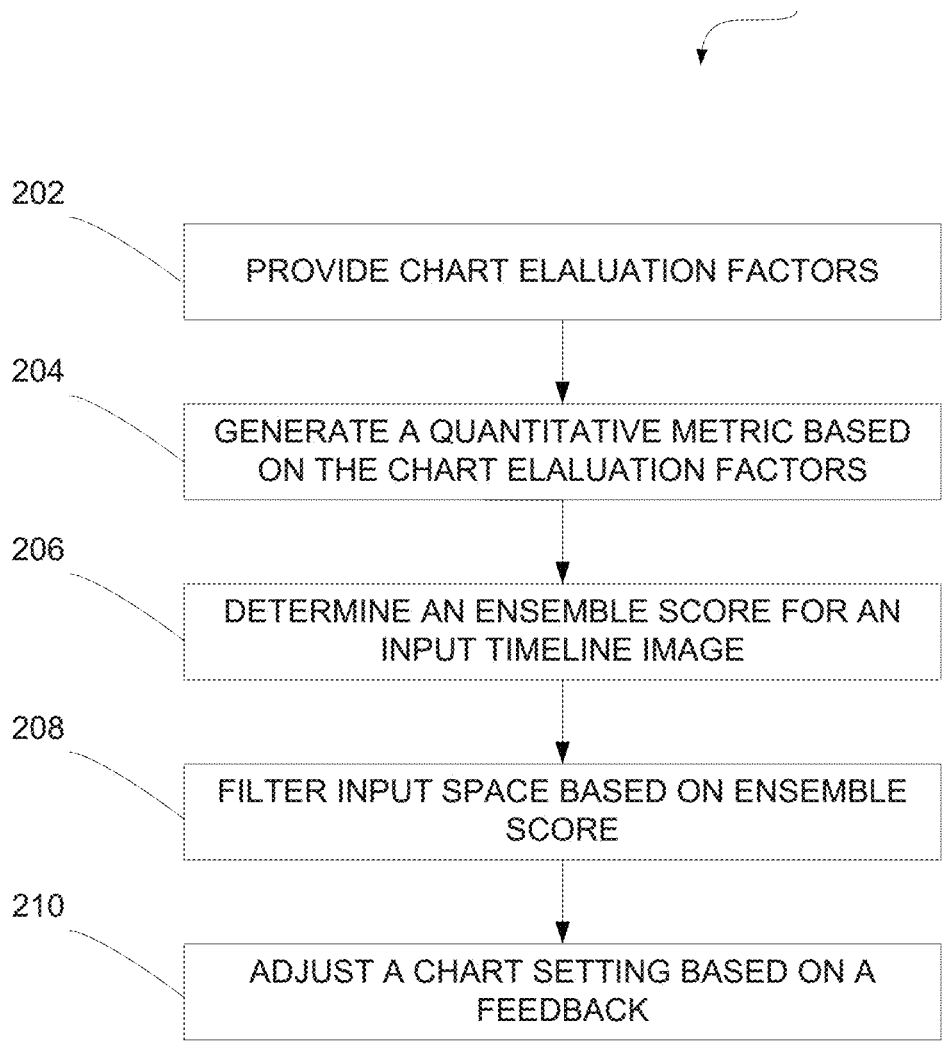
FIG. 2 is a flowchart depicting operational steps of a metric generation module within a computing device of FIG. 1, in accordance with an embodiment of the present disclosure.

FIG. 2 is a flowchart 200 depicting operational steps of metric generation module 110 in accordance with an embodiment of the present disclosure.

Metric generation module 110 operates to provide chart evaluation factors 112 for evaluating timeline images 104 for a deep learning of patterns. Metric generation module 110 also operates to generate quantitative metric 114 based on chart evaluation factors 112 using a quantitative technique. Metric generation module 110 operates to determine an ensemble score for an input timeline image based on quantitative metric. Metric generation module 110 operates to filter input space based on the ensemble score. Metric generation module 110 operates to adjust a chart setting including chart evaluation factors 112 according to a feedback based on insights from a user.

In step 202, metric generation module 110 provides chart evaluation factors 112 for evaluating timeline images 104 for a deep learning of patterns. Metric generation module 110 may provide chart evaluation factors 112 against generated historical timeline images. Timeline images 104 may be historical timeline images for training cognitive system 106. In an example, timeline images 104 may be chart images. Chart images may include chart type, scaling, color, marker shape, data density and other relative information for training cognitive system 106. Chart evaluation factors 112 may include complexity, information richness and data texture based on evaluating timeline images 104.

In step 204, metric generation module 110 generates quantitative metric 114 based on chart evaluation factors 112 using a quantitative technique. Quantitative metric 114 may be a set of figures or statistics that measure results. Metric generation module 110 may quantify timeline images 104 through different factors, e.g., chart evaluation factors 112, into quantitative metric 114. Metric generation module 110 may generate quantitative metric 114 using both subjective and or objective methodology. For example, metric generation module 110 may apply an analytic hierarchical process to generate quantitative metric 114. The analytic hierarchical process is a structured technique for organizing and analyzing complex decisions, based on mathematics and psychology. An example analytic hierarchical process is illustrated in FIG. 5. In another example, metric generation module 110 may apply fuzzification (fuzzy logic) to generate quantitative metric 114. Fuzzy logic is a form of many-valued logic in which the truth values of variables may be any real number between 0 and 1 both inclusive. Fuzzification may be the process of assigning the numerical input of a system to fuzzy sets with some degree of membership. This degree of membership may be anywhere within the interval [0,1]. If it is 0 then the value does not belong to the given fuzzy set, and if it is 1 then the value completely belongs within the fuzzy set. Any value between 0 and 1 represents the degree of uncertainty that the value belongs in the set. An example fuzzy logic is illustrated in FIG. 6. In yet another example, metric generation module 110 may apply a statistical distribution to generate quantitative metric 114. An example statistical distribution is illustrated in FIG. 7. Metric generation module 110 may apply other suitable quantitative techniques to generate quantitative metric 114. Metric generation module 110 may apply combination of analytic hierarchical process, fuzzy logic, and statistical distribution to generate quantitative metric 114. Metric generation module 110 may generate quantitative metric 114 in a subjective metric. Metric generation module 110 may generate quantitative metric 114 in an objective metric. Metric generation module 110 may generate quantitative metric 114 in a metric between a subjective and objective metric.

In step 206, metric generation module 110 determines an ensemble score for an input timeline image based on quantitative metric 114. Metric generation module 110 may determine the ensemble score for overall chart evaluation score. Metric generation module 110 may determine the ensemble score by aggregating scores in quantitative metric 114 associated with chart evaluation factors 112. Metric generation module 110 may determine the ensemble score by using the highest score in quantitative metric 114 associated with chart evaluation factors 112. Metric generation module 110 may determine the ensemble score in any other suitable methods.

In step 208, metric generation module 110 filters input space based on the ensemble score. Metric generation module 110 may evaluate an input timeline image using the ensemble score. Metric generation module 110 may systematically evaluate the setting for charts generation. Metric generation module 110 may select an input timeline image based on the ensemble score for training cognitive system 106.

In step 210, metric generation module 110 adjusts a chart setting based on chart evaluation factors 112 according to a feedback based on insights from a user. Metric generation module 110 may add chart information, e.g., quantitative metric 114 for timeline images 104 as part of the component to improve pattern detection in the deep event learning process. Metric generation module 110 may facilitate the deep learning process through selecting proper charting parameter sets, reducing input dimension and presenting better insights selection.

Figure 3:
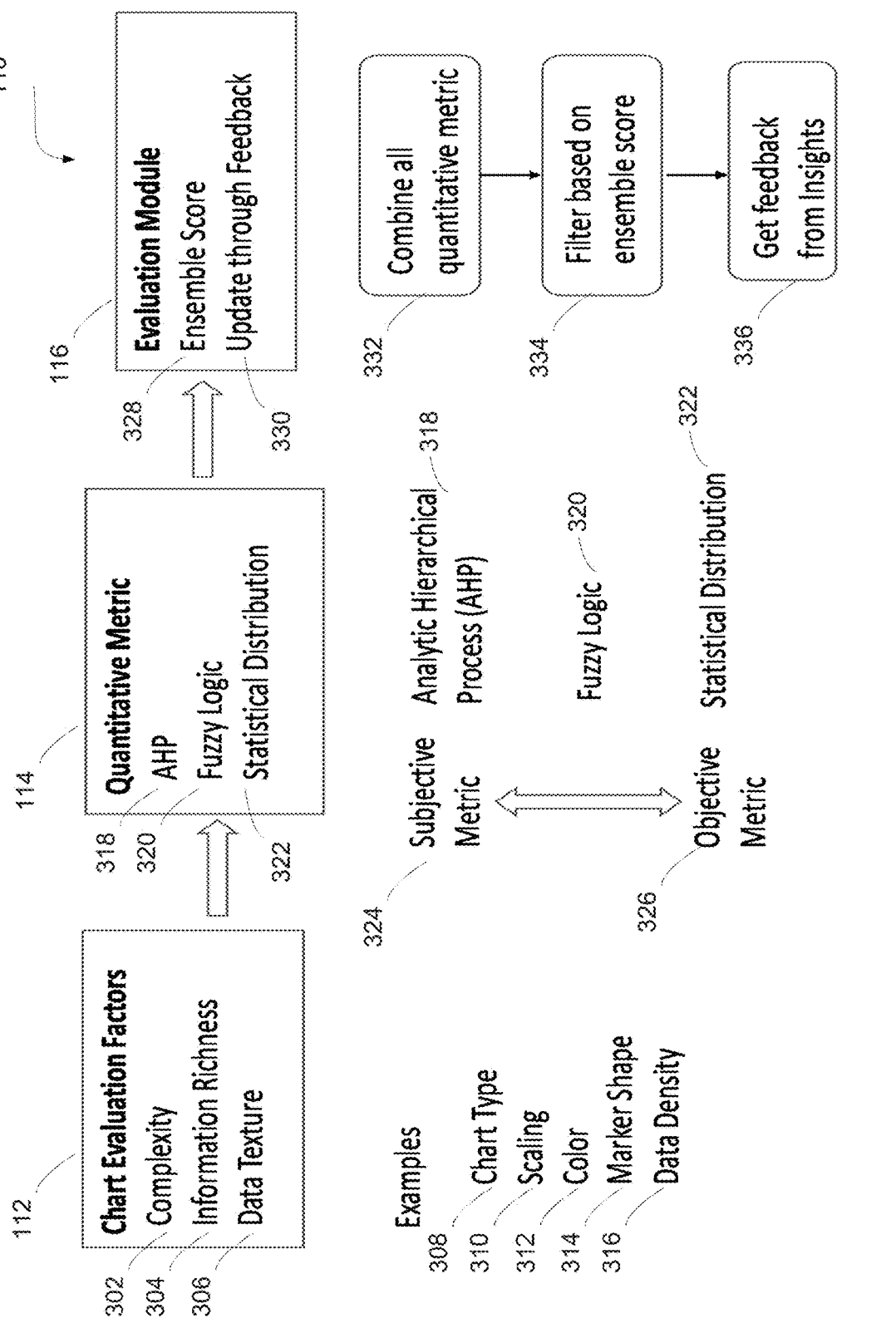
FIG. 3 is an example framework of the metric generation module within the computing device of FIG. 1, in accordance with an embodiment of the present disclosure.

FIG. 3 is an example framework of metric generation module 110, in accordance with one or more embodiments of the present disclosure.

In the example of FIG. 3, metric generation module 110 may provide chart evaluation factors 112 against generated historical timeline images. Chart evaluation factors 112 may include complexity 302, information richness 304 and data texture 306 based on evaluating timeline images 104. In an example, generated historical timeline images may be chart images. Example chart images may include chart type 308, scaling 310, color 312, marker shape 314, data density 316 and other relative example information associated with chart evaluation factors 112. Metric generation module 110 may generate quantitative metric 114 based on chart evaluation factors 112 using a quantitative technique. Metric generation module 110 may generate quantitative metric 114 using both subjective 324 and or objective 326 methodology. Metric generation module 110 may generate quantitative metric 114 using analytic hierarchical process 318, fuzzy logic 320, statistical distribution 322, and or other suitable technique or methodology. Metric generation module 110 includes evaluation module 116. Evaluation module 116 may determine ensemble score 328 for an input timeline image based on quantitative metric 114. Evaluation module 116 may determine ensemble score 328 by aggregating scores in quantitative metric 114 associated with chart evaluation factors 112. Evaluation module 116 may determine ensemble score 328 by using the highest score in quantitative metric 114 associated with chart evaluation factors 112. Evaluation module 116 may adjust or update a chart setting including chart evaluation factors 112 according to a feedback 330 based on insights from a user. In block 332, evaluation module 116 may combine all quantitative metric 114 to get ensemble score 328. In block 334, evaluation module 116 may filter input space based on ensemble score 328. In block 336, evaluation module 116 may get feedback from insights from a user and update the chart setting through feedback 330.

Figure 4:
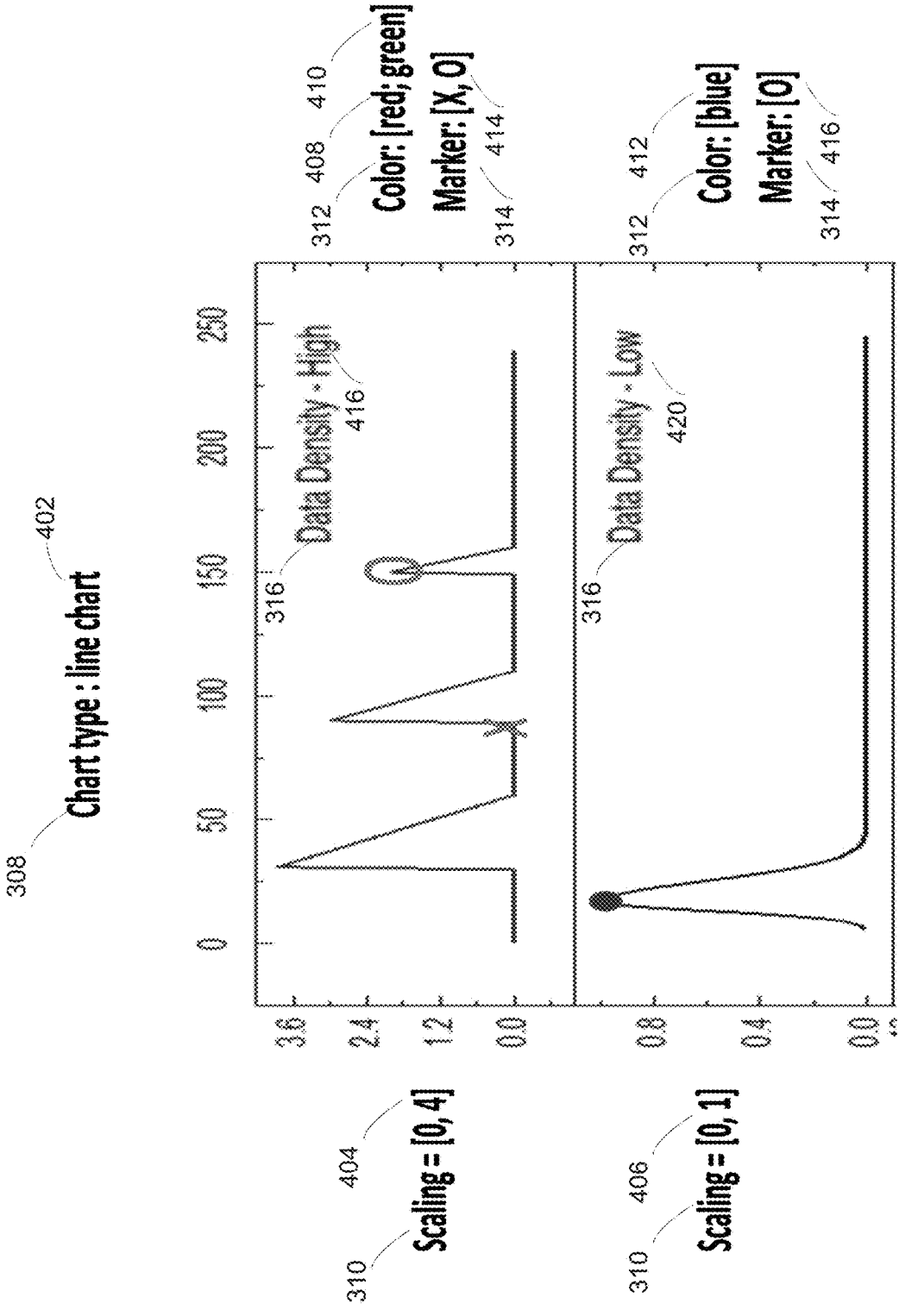
FIG. 4 is an example timeline image applied to the metric generation module within the computing device of FIG. 1, in accordance with an embodiment of the present disclosure.

FIG. 4 is an example timeline image 104 applied to metric generation module 110, in accordance with one or more embodiments of the present disclosure.

In the example of FIG. 4, timeline image 104 (e.g., generated historical chart image) includes chart type 308, scaling 310, color 312, marker 314 and data density 316 associated with chart evaluation factors 112 for metric generation module 110. In the example, chart type 308 is line chart 402. Scaling 310 for the top chart is [0, 4] 404. Scaling 310 for the bottom chart is [0,1] 406. Color 312 for the top chart is red 408 and green 410. Color 312 for the bottom chart is blue 412. Marker 314 for the top chart is [X, O] 414. Marker 314 for the bottom chart is [O] 416. Data density 316 for the top chart is high 418. Data density 316 for the bottom chart is low 420.

FIG. 5 is an example analytic hierarchical process 500 for metric generation module 110 to use to generate quantitative metric 114, in accordance with one or more embodiments of the present disclosure.

Metric generation module 110 may apply example analytic hierarchical process 500 to generate quantitative metric 114. Example analytic hierarchical process 500 may be a structured technique for organizing and analyzing complex decisions, based on mathematics and psychology. Example analytic hierarchical process 500 may evaluate different factor values 502 for a specific factor (e.g., chart evaluation factors 112) based on rating scale table 504. For example, the factor being evaluated may be chart type where three factor values could be scatter plot, bar chart, or line chart. Example analytic hierarchical process 500 may generate eigenvector for metric 506.

FIG. 6 is an example fuzzy logic process 600 for metric generation module 110 to use to generate quantitative metric 114, in accordance with one or more embodiments of the present disclosure.

Fuzzy logic may be a form of many-valued logic in which the truth values of variables may be any real number between 0 and 1 both inclusive. Fuzzy logic may be based on the observation that people make decisions based on imprecise and non-numerical information. In the example of FIG. 6, fuzzy logic process 600 may evaluate two factors together when the two factors might be related (or dependent). For example, factor A 602 may be number of colors and factor B 604 may be number of markers. Metric generation module 110 may apply fuzzy logic in steps 606 which will provide an evaluation metric (e.g., quantitative metric 114) based on factor value 608 of A 602 and B 604.

FIG. 7 is an example statistical distribution 700 for metric generation module 110 to use to generate quantitative metric 114, in accordance with one or more embodiments of the present disclosure.

In the example of FIG. 7, each factor 702 has one scoring curve 704. For each factor value 706, metric generation module 110 may obtain quantitative metric 114 based on the corresponding factor curve 704.

Figure 8:
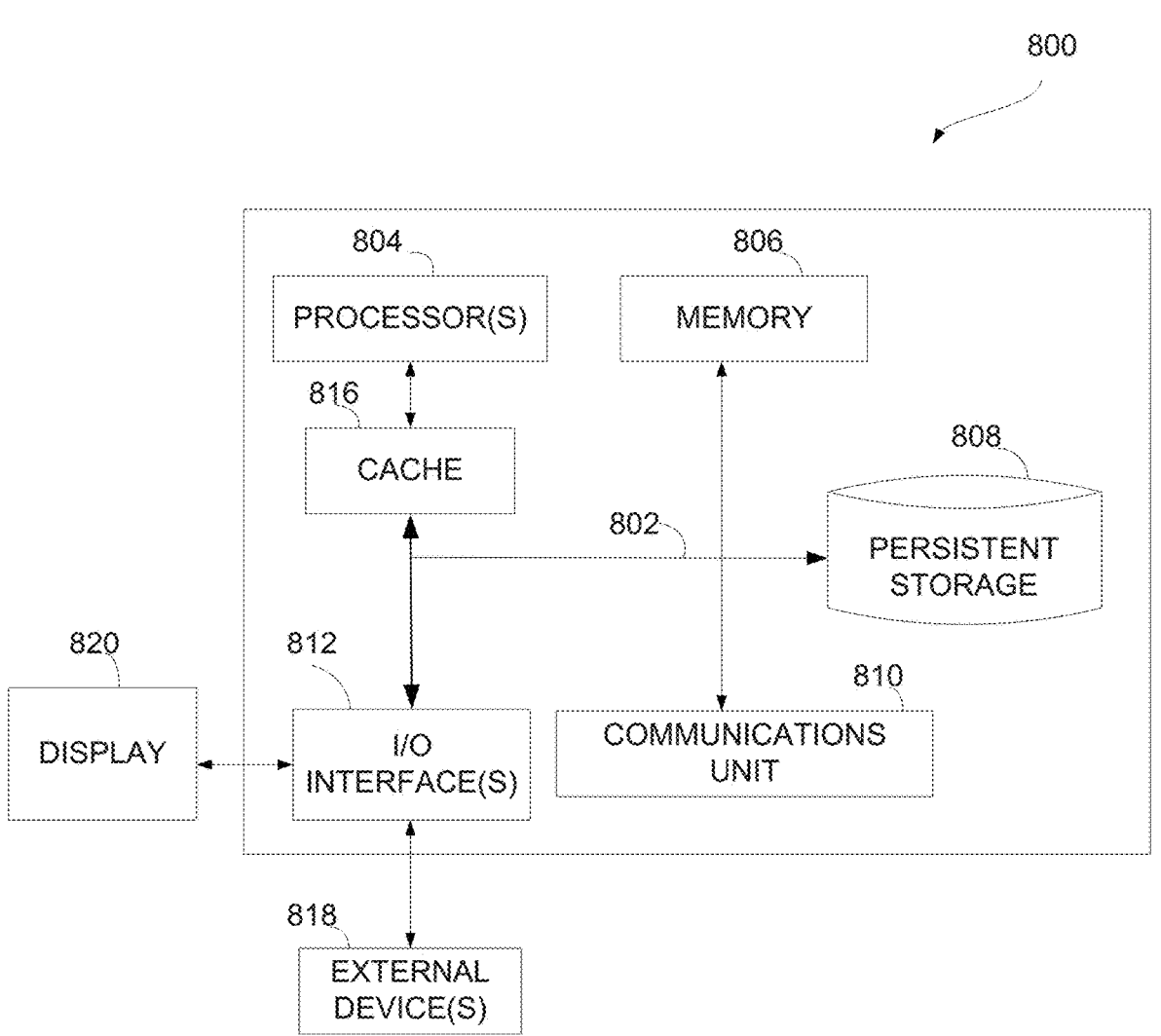
FIG. 8 is a block diagram of components of the computing device of FIG. 1, in accordance with an embodiment of the present disclosure.

FIG. 8 depicts a block diagram 800 of components of computing device 102 in accordance with an illustrative embodiment of the present disclosure. It should be appreciated that FIG. 8 provides only an illustration of one implementation and does not imply any limitations with regard to the environments in which different embodiments may be implemented. Many modifications to the depicted environment may be made.

Computing device 102 may include communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Metric generation module 110 may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Metric generation module 110 may be downloaded to persistent storage 808 through communications unit 810.

I/O interface(s) 812 allows for input and output of data with other devices that may be connected to computing device 102. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., metric generation module 110 can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method, comprising:

providing, by one or more processors, one or more chart evaluation factors corresponding to a plurality of historical timeline images;

generating, by the one or more processors, a quantitative metric for the plurality of historical timeline images, based on the one or more chart evaluation factors, using one or more quantitative techniques, wherein the one or more quantitative techniques comprise at least one selected from the group consisting of analytical hierarchical process, fuzzy logic, and statistical distribution;

determining, by the one or more processors, a score for each of one or more input timeline images, based on the quantitative metric;

selecting, by the one or more processors, automatically an input timeline image from the one or more input timeline images for training a cognitive system in a deep event learning process, based on the score of the one or more input timeline images, wherein the cognitive system uses the selected input timeline image to detect patterns in the plurality of historical timeline images;

in response to receiving a feedback based on insights from a user, adjusting, by the one or more processors, a chart setting for evaluating the one or more input timeline images, wherein the chart setting comprises the one or more chart evaluation factors; and applying, by the one or more processors, the adjusted chart setting for selecting further input timeline images, from the one or more input timeline images, for training the cognitive system in the deep event learning process, wherein determining the score comprises determining a highest score among scores in the quantitative metric associated with the one or more chart evaluation factors.

2. The computer-implemented method of claim 1, wherein providing the one or more chart evaluation factors includes determining the one or more chart evaluation factors based on at least one of a chart type, scaling, color, marker shape, and data density.

3. The computer-implemented method of claim 1, wherein determining the score includes aggregating scores in the quantitative metric associated with the one or more chart evaluation factors.

4. A computer program product, comprising:

one or more computer readable storage media; and program instructions collectively stored on the one or more computer readable storage media, the program instructions comprising:

program instructions to provide one or more chart evaluation factors corresponding to a plurality of historical timeline images;

program instructions to generate a quantitative metric for the plurality of historical timeline images, based on the one or more chart evaluation factors, using one or more quantitative techniques, wherein the one or more quantitative techniques comprise at least one selected from the group consisting of analytical hierarchical process, fuzzy logic, and statistical distribution;

program instructions to determine a score for each of one or more input timeline images, based on the quantitative metric;

program instructions to select automatically an input timeline image from the one or more input timeline images for training a cognitive system in a deep event learning process, based on the score of the one or more input timeline images, wherein the cognitive system uses the selected input timeline image to detect patterns in the plurality of historical timeline images;

program instructions to, in response to receiving a feedback, adjust a chart setting to evaluate the one or more input timeline images, wherein the chart setting comprises the one or more chart evaluation factors; and program instructions to apply the adjusted chart setting to select further input timeline images, from the one or more input timeline images, for training the cognitive system in the deep event learning process, wherein the program instructions to determine the score include program instructions to determine a highest score among scores in the quantitative metric associated with the one or more chart evaluation factors.

5. The computer program product of claim 4, wherein the program instructions to provide the one or more chart evaluation factors include program instructions to determine the one or more chart evaluation factors based on at least one of chart type, scaling, color, marker shape and data density.

6. The computer program product of claim 4, wherein the program instructions to determine the score include program instructions to aggregate scores in the quantitative metric associated with the one or more chart evaluation factors.

7. A computer system, comprising:

one or more computer processors;

one or more computer readable storage media; and program instructions stored on the one or more computer readable storage media for execution by at least one of the one or more computer processors, the program instructions comprising:

program instructions to provide one or more chart evaluation factors corresponding to a plurality of historical timeline images;

program instructions to generate a quantitative metric for the plurality of historical timeline images, based on the one or more chart evaluation factors, using one or more quantitative techniques, wherein the one or more quantitative techniques comprise at least one selected from the group consisting of analytical hierarchical process, fuzzy logic, and statistical distribution;

program instructions to determine a score for each of one or more input timeline images, based on the quantitative metric;

program instructions to select automatically an input timeline image from the one or more input timeline images for training a cognitive system in a deep event learning process, based on the score of the one or more input timeline images, wherein the cognitive system uses the selected input timeline image to detect patterns in the plurality of historical timeline images;

program instructions to, in response to receiving a feedback, adjust a chart setting to evaluate the one or more input timeline images, wherein the chart setting comprises the one or more chart evaluation factors; and program instructions to apply the adjusted chart setting to select further input timeline images, from the one or more input timeline images, for training the cognitive system in the deep event learning process, wherein the program instructions to determine the score include program instructions to determine a highest score among scores in the quantitative metric associated with the one or more chart evaluation factors.

8. The computer system of claim 7, wherein the program instructions to provide the one or more chart evaluation factors include program instructions to determine the one or more chart evaluation factors based on at least one of a chart type, scaling, color, marker shape, and data density.

9. The computer system of claim 7, wherein the program instructions to determine the score include program instructions to aggregate scores in the quantitative metric associated with the one or more chart evaluation factors.

* * * * *